United States Patent [19]

Huang, Chuan-Guo

[11] Patent Number: 4,819,764
[45] Date of Patent: Apr. 11, 1989

[54] FULLY AUTOMATIC SINGLE-PERSON OPERATED GREASE INJECTION DEVICE

[76] Inventor: Huang, Chuan-Guo, No. 130, Jong-Jeng N. Rd., Ruey-Suey Hsiang, Hwa Lien Hsien, Taiwan

[21] Appl. No.: 64,876

[22] Filed: Jun. 22, 1987

[51] Int. Cl.⁴ ............................................. F16N 21/00
[52] U.S. Cl. ...................................... 184/36; 417/430
[58] Field of Search ................. 184/1.5, 7.2, 26, 27.1, 184/36, 105.1, 105.2, 105.3, 109; 336/332, 333, 334, 255, 256; 417/430

[56] References Cited

U.S. PATENT DOCUMENTS

| | | | |
|---|---|---|---|
| 749,477 | 1/1904 | Delaney | 184/27.1 |
| 1,829,173 | 10/1931 | Wertz | 184/1.5 |
| 2,281,094 | 4/1942 | Chambers | 366/332 X |
| 2,417,372 | 3/1947 | Morris | 366/332 X |
| 2,425,848 | 8/1947 | Vawter | 184/1.5 X |
| 2,479,139 | 8/1949 | Seigel | 184/1.5 |
| 3,405,643 | 10/1968 | Berman | 184/29 X |
| 3,987,869 | 10/1976 | Bowers | 184/27.1 X |

FOREIGN PATENT DOCUMENTS 400772   2/1974   U.S.S.R. ............................. 184/26

Primary Examiner—Leonard E. Smith
Attorney, Agent, or Firm—Asian Pacific International Patent and Trademark Office

[57] ABSTRACT

The structure of the present invention "a fully automatic single-person operated grease gun injection device" comprises of an exterior case body, a generating device system, a compressed grease pump, a grease scratching/collecting harrow control connecting rod, a rolling cylinder, a grease gun, etc. By means of the precedingly mentioned structures, the fully automatic grease gun injection device thus composed can provide an application operation for a single person so as to achieve the operational effect of grease injection and the upgrading of working efficiency.

7 Claims, 4 Drawing Sheets

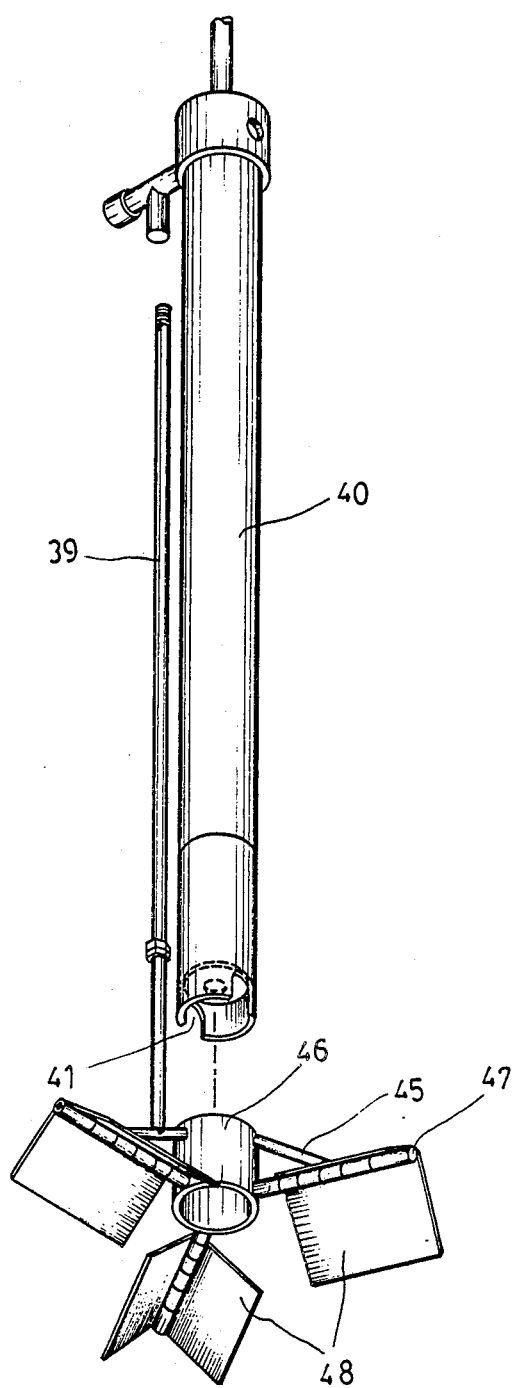
FIG·3

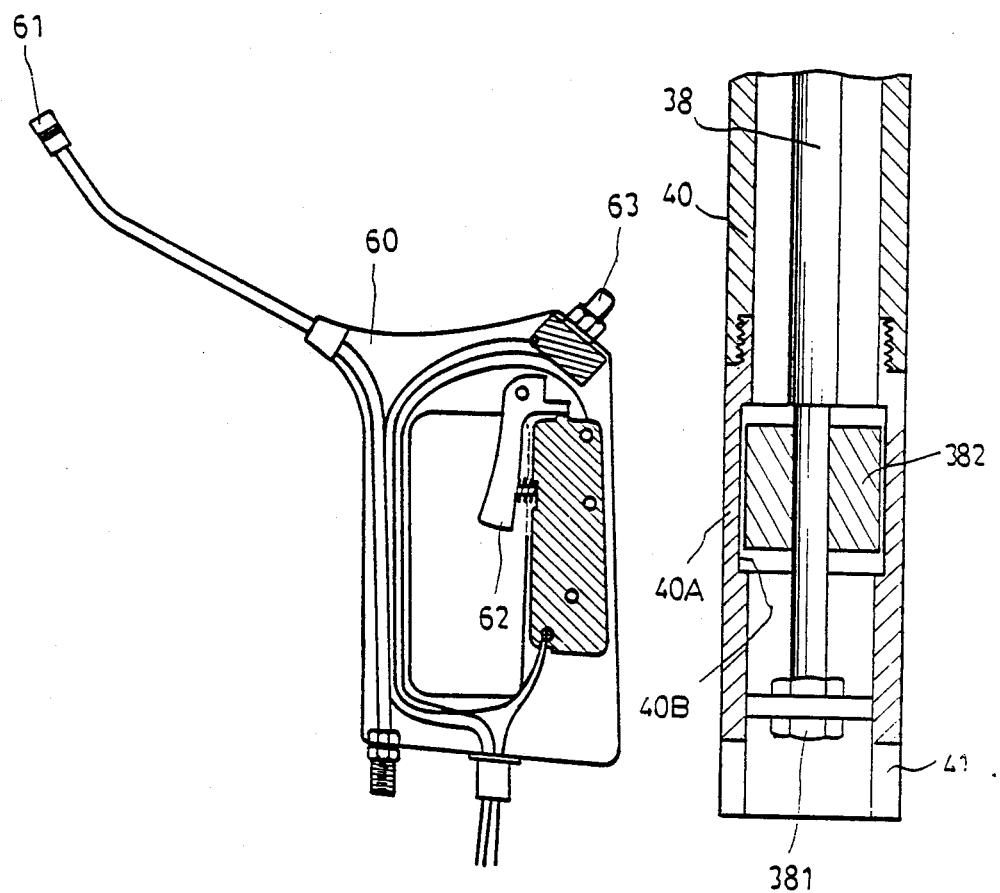
FIG·4   FIG·5

FULLY AUTOMATIC SINGLE-PERSON OPERATED GREASE INJECTION DEVICE

BACKGROUND OF THE INVENTION

In order to maintain the highly functional performance of such mechanical heavy types of vehicles as dredger, bulldozer or a truck-mounted crane, a continual maintenance work has to be conducted daily. The aforesaid continual maintenance work generally denotes fuelling, water adding or checking of spare parts and components, particularly important in denoting the lubricating maintenance of greasing.

The mechanical instrument and method for greasing currently available are as follows: Firstly, there is a "a portable small cylindrical grease gun". Prior to using such an instrument, the grease has first to be dugged from the barrel in which the grease is kept by hand and then filled into the portable small cylindrical grease gun. Screw the lid tightly. Then injected the grease through the mouth of the grease gun by pressing both hands. In such a process, the scratching of grease and the filling of it are all conducted by hand and after that the hand has to be washed before the application of the grease can be conducted, resulting not only in causing not only a lot of troubles but also in causing serious pollution. Secondly, there is a "two-person operated barrel type of grease injection device attached with an extended rubber tube. In another case if two persons are involved in the operation by means of using the structure of an air compressor, in which a continual pressing of the pressing rod in the barrel has to be conducted by a person, while the injection of grease has to be conducted by another person who carried the grease gun in his hand dragging the rubber tube behind him in climbing up onto or going underneath a truck or a motor vehicle, which not only wasted the manpower of one more worker, but also made the motion of moving about unappropriate to cope with the actual requirement of grease injection, particularly when the center of the grease inside the barrel (that is, the position close to the periphery of the pump has been sucked into a state of vacuum which made continual suction of grease impossible. As a remedy, the grease which is located at the periphery has to be scratched by hand and pushed to the center in proximity of the suction jet cylinder resulting in the hand of the worker thoroughly stained with grease and, cleaning of the hand should first be done before further application of grease can be processed. In some cases, heavy oil is added to the grease for dilution purpose which, however, will considerably reduce the quality of the grease as well as the degree of its lubricity. Therefore, this is not regarded as a suitable method. In view of the foregoing defects, the inventor kept on researching in pursuance of rennovation, and managed for the first time the presentation of the structure of a set of "grease scratching/collecting harrow" to replace the aforesaid function which is formerly processed by hand. The said set of structure will enable the grease to be continually sucked and supplied by the pump to allow the injection process to be conducted at the outside of the grease barrel, wherein a hand like "grease scratching-collecting harrow" in the interior will conduct the process of scratching and collecting of the grease which lies at the outer periphery to the proximity of the center (the pump) to be pumped and supplied continually for grease injection. It is so arranged that in the entire process of grease pumping until the end when the grease in the barrel has been wholly consumed, the touching of grease by hand will not be needed and the original quality of the grease can also be maintained.

SUMMARY OF THE INVENTION

The present invention is pertaining to a kind of fully automatic single-person operated grease injection device, particularly denoting the device of a grease injection gun to be operated by a single person without getting both the two hands of the worker stained with grease in the course of the operation.

The purpose and the features of the present invention lie in the providing of the device of a fully automatic singleperson operated grease injection gun wherein the defects found in the traditional grease gun can be avoided, which is proved to be more convenient in application, capable of upgrading working efficiency and comprising of the following features:

(1) Fully automatic and operated by a single person resulting in the saving of manual labour;

(2) In replacing the grease, place the originally packed grease barrel directly into the double layered protective barrel of the present invention. Then place the compressing pump inside the said barrel and connect the electric supply for the required operation, in the entire course of which both the two hands will not be stained by grease.

(3) By means of the oscillation force produced by the operating of the present invention, the grease can be compressed towards the direction of the bottom of the grease barrel while an upward and downward motion which opened and closed in turn will be conducted by a triple check blade which will continually sucked the grease from the barrel;

(4) At the time of application, the device of the present invention can be installed on a heavy mechanical motor vehicle so that maintenance work can be carried out whenever it is required.

BRIEF DESCRIPTION OF THE DRAWINGS

FIG. 1—1 is an opposite side view of the coupled driving arm of the present invention.

FIG. 3 is the structural view illustrating the grease scratching and collecting harrow and the compressed grease pump.

FIG. 4 is the interior structural view of the grease gun of the present invention.

FIG. 5 is the partial section view of the compressed grease gun of the present invention.

DETAILED DESCRIPTION OF THE PRESENT INVENTION

Figure 1:
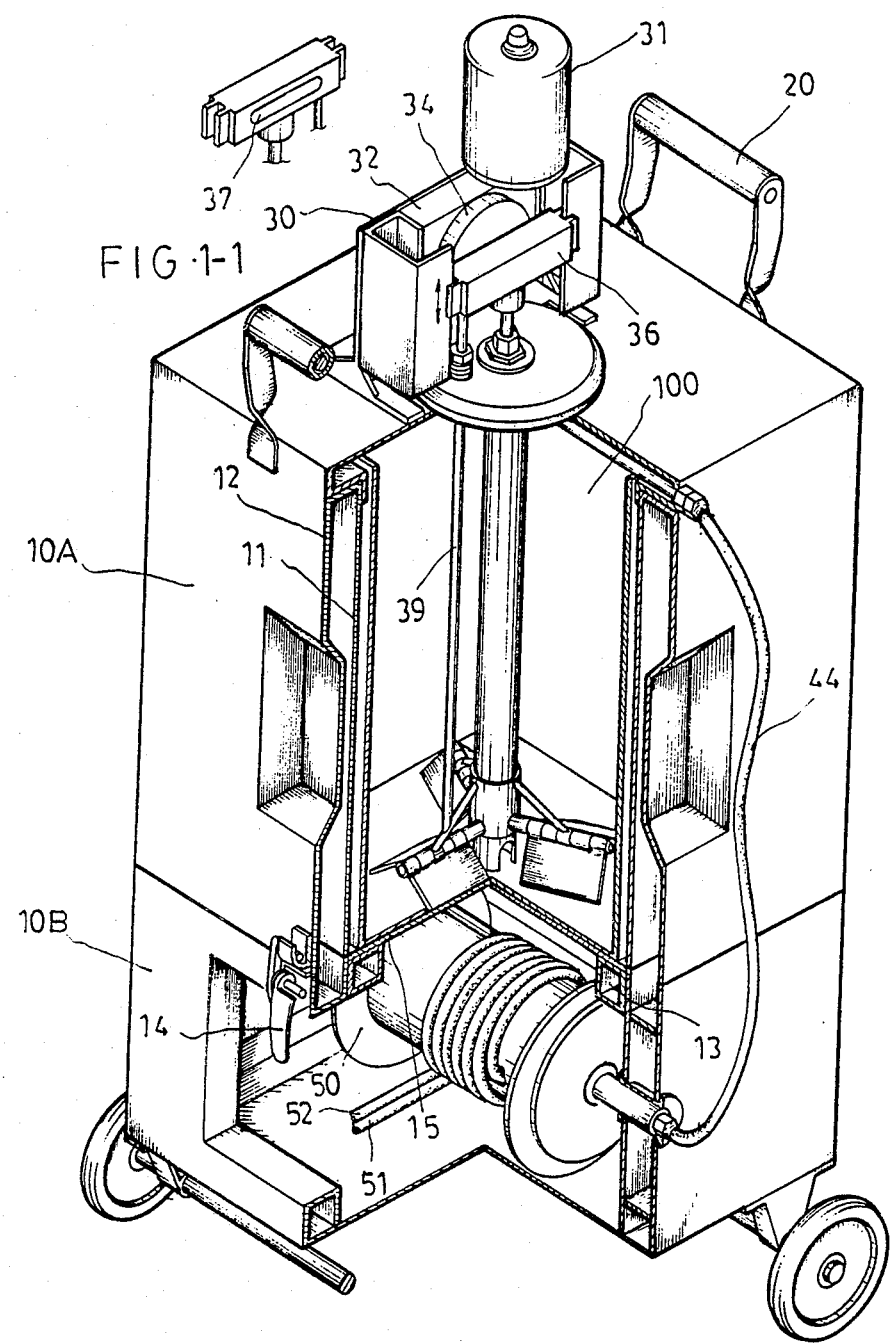
FIG. 1 is a solid section view of the present invention.
Figure 2:
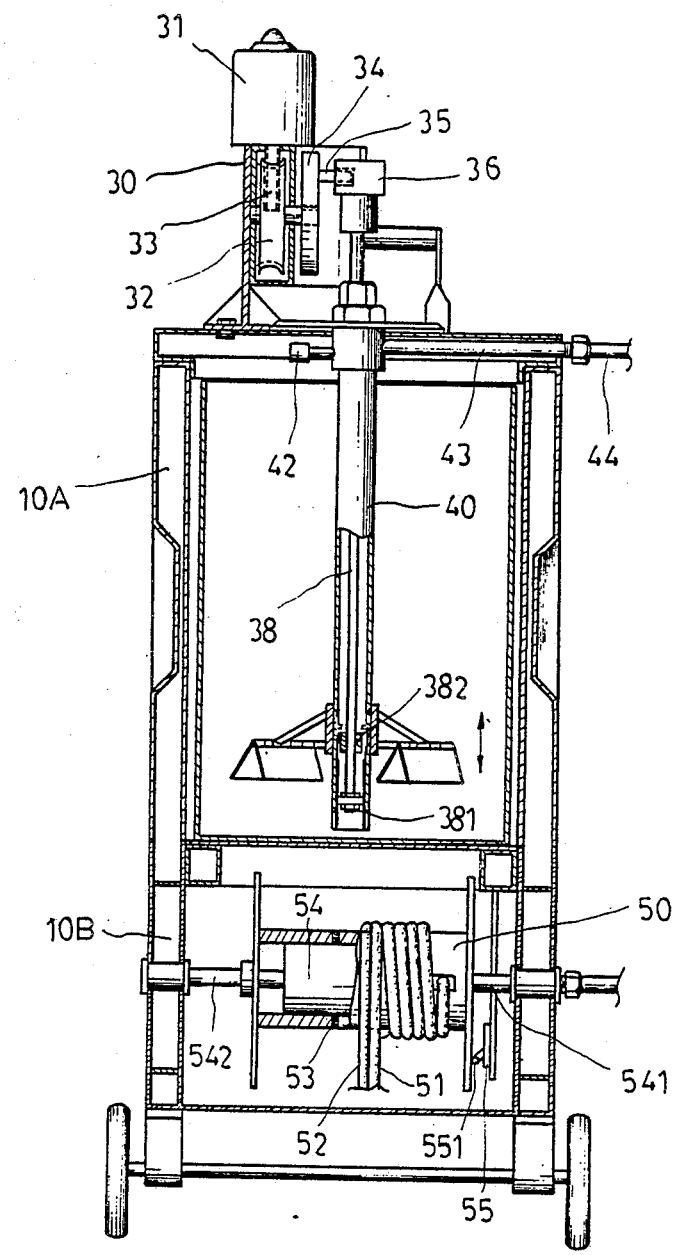
FIG. 2 is the observe side section view of the present invention.

Please refer to FIG. 1 and FIG. 2, wherein the exterior case body (10) of the present invention is roughly divided into an upper layer (10 A) and a lower layer (10 B). The said exterior case body (10) comprises of an interior wall (11) and an exterior wall (12), having the space thus compossed in capable of resisting any impact force which may caused a concave hole or a hole of leakage to be formed on the body of the case so as not to affect the container in the interior of the case body. A cushion tube square in shape (13) is attached to the surrounding periphery of the bottom part of the top layer (10 A) of the said case body (10) so as to support the grease from falling into the bottom of the barrel at the bottom layer (10 B) when the grease barrel is being placed into the case body. A compact locking device (14) is attached to the two exterior sides of the case so that a secure locking of the top layer (10 A) and the bottom layer (10 B) of the case can be made when the aforesaid two layers are being closed up together. At the bottom part of the upper layer (10B) of the case body, an interior bottom cushion plate (15) which is suitable for the placing of the original square or round shaped grease barrel is attached. In addition, a handle (20) is attached to the laterals at the top of the top layer (10 A) of the case body, which can easily be turned on and served as a means of carrying the bottom layer (10 A) of the exterior body.

A generating system rod motion-generating means (30) is attached to the top layer (10 A) of the exterior case body of the present invention. The said system comprises of a motor (31) and a reducing middle gear (32) functioned by a screw wherein the speed reducing is achieved by means of screwing the said reducing middle gear or worm wheel (32) caused by the worm (33) which is jointly attached with the motor shaft core. A generating wheel (34) is jointly attached with the shaft at the middle part of the said reducing middle gear (32) to enable the generating wheel or crank element (34) to rotate after accompanying the said gear (32) in its speed reducing process. A protrusive shaft (35) is attached to the lateral sides of the said generating wheel (34), being so arranged that the said protrusive shaft (35) can be joined to the interior of the retangular hole of the coupled driving arm (36) as indicated per FIG. 1—1 so that an up and down vertical motion of a circumferential motion caused by the generating wheel (34) through the coupled driving arm (36) can be formed. Further, the said coupled driving arm (36) is connected with two connecting rods, one of which is a compressed piston rod (38) which is inserted inside the compressed grease pump (40) as described below, and the other is a grease scratching/collecting harrow control connecting rod (39). When the circumferential motion is being turned to an up and down vertical motion caused by the speed reducing of the reducing middle gear (32) which is being functioned by screwing through the coupled driving arm (36) of the generating wheel (34), the same up and down vertical motion can also be conducted by the compressed piston rod (38) which is attached to the aforesaid coupled driving arm (36) and the grease scratching/collecting harrow control connecting rod (39).

As illustrated by FIG. 2, FIG. 3 and FIG. 5, the compressed piston rod (38) of the present invention is inserted into the compressed pump (40) while the extreme end of said compressed piston rod (38) is attached with a compressed piston (381) capable of conducting a suction motion, while the extreme end is screwed with a cylindrical body, the bottom part of which formed a fork shaped grease suction inlet (41), being so arranged that the aforesaid fork shape grease inlet is composing of two corresponding extreme ends. Through such an inlet the grease, after having been sucked by the compressed piston (381), will enter into the compressed grease pump (40). The said compressed pump (40), after having the grease sucked in through the compressed piston (381) for compressing, will keep on repeating its suction process and increasing its pressure resulting in the accumulation of grease to be kept inside the compressed pump (40), from which the grease will be drawn out for application through the oil pipe (43). If an excessive quantity of pressure is found inside the grease pump (40), it can be automatically leak out through the separately attached decompression safety valve (42). The grease, after having been drawn out through the oil pipe (43), will pass along a bending oil pipe (44) attached in the exterior of the case body (10) into the rolling cylinder or drum (50) located at the bottom layer (10 B) of the exterior case body. Then it will pass through a soft oil pipe (51) and be drawn out from the exit of the grease gun (60) of the present invention. The extreme end of the said compressed grease pump (40) is screwed with a cylindrical body (40 A), the interior wall of which is formed a concave part or recess (40B) which served as a location to accommodate a grease checking block (382) which is jointly attached with the bottom part of the said compressed piston (38). There is a gap existing between the grease checking block (382) and the cylindrical body (40A) so as to allow the grease to be sucked along the gap into the compressed pump (40). The grease checking block (382), at the time when the grease is being sucked into the compressed pump, can reduce the flowing away of the grease which is being caused by the up and down motion produced by the compressed piston (38).

The grease scratching/collecting control, connecting rod (38) attached to the aforesaid coupled driving arm (36) is having at its bottom end firmly attached with a grease scratching/collecting harrow stand (45), comprising of triple stands which are directly installed on the movable ring (46) and can move up and down at random in the exterior of the compressed grease pump (40) at each end of the aforesaid triple stands (45), a blade shaft (47) is attached and to which two movable blades (48) are joined. When an up and down motion is being conducted by the coupled driving scratching/collecting harrow control connecting rod of the coupled driving arm (36), an upward and downward swinging motion of the triple movable blades (48) is also being generated at the same time so that the grease, by means of such upward and, downward motion conducted by the triple movable blades (48), will be rapidly scratched/collected and sucked into the compressed grease pump (40) until it fills up the gap of the said pump so as to improve the traditional defect of having it done manually.

At the bottom layer (10B) of the exterior case body, a rolling cylinder (50) is attached, inside of which a motor (54) is screwed to form an integral body, wherein said motor (54) is having its two shafts (541) (542) firmly attached at the two lateral walls of the bottom layer (108) of the exterior case body. Therefore, at the time of the fluttering of the motor (54), the rolling cylinder (50) will also be coupled driven to conduct the same revolving motion so as to achieve an absorb/release motion to be produced by the soft oil pipe (51) and the cable wire (52) attached to the rolling cylinder (50). Please refer to the indication of FIG. 4, wherein the grease gun (60) of the present invention, besides attaching with an oil nozzle (61) is also attached with an operational switch (62) to operate and control the injection of grease. The said switch (62) when being pressed down, will get the motor (31) of the device system (30) started, while the coupled driving arm (36) will coupled drive the compressed piston (38) and the grease scratching/collecting harrow control connecting rod (39) to conduct grease suction. The grease will then pass along the oil pipe (51) to the aforesaid soft oil pipe (51) attached to the aforesaid rolling cylinder (50). Then the grease will be injected through the oil nozzle (61) of the grease gun (60) into the mechanical motor vehicle for which maintenance work is required.

Please refer to FIG. 2 and FIG. 4 of the present invention, wherein at the top end of the grease gun (60) a thread coiling button (63) is attached so as to control the absorb/release motion of the soft oil pipe (51) and the cable wire (52). The said thread coiling button (63) is joined to a push switch (55) attached at one end of the rolling cylinder (50). On the exterior wall at one end of the said rolling cylinder (50), a layer of gold plated stuff is formed, which keeps in a state of constant touch with the connecting point (551) attached to the push button (55) so as to ensure that the circuit, being affected by the revolving of the rolling cylinder at the conducting through of circuit by the thread coiling button (63), will not be stopped from functioning.

Summarizing the foregoing descriptions, the present invention may be regarded as a structure of skillful design featured for its capability of actually solving the defects found in the traditional method of grease injection, avoiding pollution because of the elimination of manual operation, providing a means of single-person fully automatic operation for grease injection, resulting in the saving of time and energy as well as the upgrading of working efficiency. Therefore, it can be regarded as a great renovation for maintenance work. However, the foregoing description of the present invention is only confined to one of its example of embodiment. The various alteration or changes of design which are defined within the area of the purpose, characteristics and structure as described herein, shall be included within the area of claims of the present invention.

I claim:

1. A fully automatic single-person operated grease gun injection device comprising:

an exterior case body divided into a hollow top layer (10A) defining a grease barrel-reception cavity, and a bottom layer (10B) located below said top layer, said bottom layer including a square cushion tube (13) extending therearound to bear the weight of a grease barrel located in the aforementioned cavity;

handle means (20) attached to said top layer;

means (14) locking the two layers together;

motion-generating means (30) located on said top layer; said motion-generating means comprising first motor (31), a worm (33) driven by said motor, a worm wheel (32) driven be said worm, and a crank element (34) rigidly connected to said worm wheel; said motion-generating means further comprising an arm structure (36) driven by said crank element for vertical oscillatory motion;

a grease pump comprising stationary vertical tube (40, 40A) extending downwardly from said top layer within the aforementioned cavity for disposition within a grease barrel, and a piston means (38,381) extending downwardly from said arm structure (36) within said tube, whereby vertical reciprocation of said piston means moves grease upwardly through said tube;

a grease scratching-collecting means comprising a control rod (39) depending from said arm structure (36), and a grease-displacing means (48) connected to the lower end of the control rod for moving grease toward the space adjacent to the lower end of the aforementioned vertical tube;

a rotary drum (50) located within said bottom layer; a second motor (54) connected to said drum for rotating same around the drum axis; a flexible grease pipe (51) coiled around said drum whereby drum rotation causes said flexible pipe to be drawn onto or off of the drum surface; conduit means (43,44) interconnecting said vertical tube and one end of the flexible grease pipe, whereby operation of the pump causes grease to flow through the flexible pipe;

a grease gun (60) having a nozzle (61) connected to the other end of the flexible pipe for discharging grease out of the injection device; an electrical control switch (63) carried on said grease gun;

and an electrical cable (52) extending along said flexible pipe in electrical connection with said control switch and said second motor.

2. The injection device of claim 1 wherein said vertical tube includes a main tube section (40) and a cylindrical section (40A) having a screw fit on the lower end of said main tube section; said cylindrical section (40A) having a fork-shaped lower end defining pump section inlet openings.

3. The injection device of claim 1 wherein said vertical tube has an inlet opening at its lower end, and said piston means reciprocates across said inlet opening.

4. The injection device of claim 1 wherein said grease scratching-collecting means includes a ring (46) slidably encircling said vertical tube, three shafts (47) radiating outwardly from said ring, and two grease displacing blades (48) swingably mounted on each shaft.

5. The injection device of claim 1 and further comprising switch means for conducting current between said rotary drum and a point on said bottom layer; said switch means comprising a conductive ring on the drum centered on the drum axis, and a switch contact (551) on the bottom layer.

6. The injection device of claim 1 wherein said vertical tube has an internal annular recess (40B) in its interior surface at a point near the tube lower end.

7. The injection device of claim 6 and further comprising a check valve block (382) slidably mounted on the piston means within said annular recess to prevent downward flow of grease in said tube; said block having a clearance gap relative to the surface of the annular recess for upflow of grease through the tube.

* * * * *